US 6,716,932 B2

(12) United States Patent
Kennedy et al.

(10) Patent No.: US 6,716,932 B2
(45) Date of Patent: Apr. 6, 2004

(54) HIGH CONSISTENCY ABSORBABLE POLYMERIC RESIN

(75) Inventors: John Kennedy, Guilford, CT (US); Thomas F. Elliott, Ansonia, CT (US); Nelson J. Clift, Trumbull, CT (US)

(73) Assignee: Tyco Healthcare Group LP, Norwalk, CT (US)

( * ) Notice: Subject to any disclaimer, the term of this patent is extended or adjusted under 35 U.S.C. 154(b) by 0 days.

(21) Appl. No.: 09/912,700

(22) Filed: Jul. 25, 2001

(65) Prior Publication Data

US 2002/0123605 A1 Sep. 5, 2002

Related U.S. Application Data

(60) Provisional application No. 60/225,815, filed on Aug. 16, 2000.

(51) Int. Cl.$^7$ .......................... C08F 20/00; C08G 63/06
(52) U.S. Cl. ................. 525/450; 528/361; 528/492; 524/784
(58) Field of Search ................. 528/361, 492; 525/450; 524/784

(56) References Cited

U.S. PATENT DOCUMENTS

| | | | |
|---|---|---|---|
| 2,668,162 A | 2/1954 | Lowe | 528/357 |
| 2,703,316 A | 3/1955 | Schneider | 528/357 |
| 2,758,987 A | 8/1956 | Saizber | 528/357 |
| 3,225,766 A | 12/1965 | Baptist et al. | 128/335.5 |
| 3,297,033 A | 1/1967 | Schmitt et al. | 128/335.5 |
| 3,422,181 A | 1/1969 | Chirgwin, Jr. | 264/345 |
| 3,463,158 A | 8/1969 | Schmitt et al. | 128/334 |
| 3,531,561 A | 9/1970 | Trehu | 264/210 |
| 3,565,869 A | 2/1971 | DeProspero | 528/357 |
| 3,597,449 A | 8/1971 | DeProspero et al. | 260/340.2 |
| 3,620,218 A | 11/1971 | Schmitt et al. | 128/334 |
| 3,626,948 A | 12/1971 | Glick et al. | 128/335.5 |
| 3,636,956 A | 1/1972 | Schneider | 128/335.5 |
| 3,736,646 A | 6/1973 | Schmitt et al. | 29/458 |
| 3,772,420 A | 11/1973 | Glick et al. | 264/102 |
| 3,773,919 A | 11/1973 | Boswell et al. | 424/19 |
| 3,792,010 A | 2/1974 | Wasserman et al. | 528/357 |
| 3,797,499 A | 3/1974 | Schneider | 128/334 R |
| 3,839,297 A | 10/1974 | Wasserman et al. | 528/357 |
| 3,867,190 A | 2/1975 | Schmitt et al. | 117/138.8 |
| 3,875,937 A | 4/1975 | Schmitt et al. | 128/156 |
| 3,878,284 A | 4/1975 | Schmitt et al. | 264/184 |
| 3,982,543 A | 9/1976 | Schmitt et al. | 128/335.5 |
| 4,060,089 A | 11/1977 | Noiles | 128/335 |
| 4,137,921 A | 2/1979 | Okuzumi et al. | 128/335.5 |
| 4,141,738 A | 2/1979 | Rapp | 106/39 |
| 4,157,437 A | 6/1979 | Okuzumi et al. | 528/354 |
| 4,175,988 A | 11/1979 | Rapp | 148/189 |
| 4,243,775 A | 1/1981 | Rosensaft et al. | 525/415 |
| 4,259,410 A | 3/1981 | Dittmann et al. | 428/461 |
| 4,273,920 A | 6/1981 | Nevin | 528/361 |
| 4,275,813 A | 6/1981 | Noiles | 206/339 |
| 4,300,565 A | 11/1981 | Rosensaft et al. | 128/335.5 |
| 4,302,551 A | 11/1981 | Horn et al. | 521/163 |
| 4,387,769 A | 6/1983 | Erbstoesser et al. | 166/295 |
| 4,523,597 A | 6/1985 | Kaplan et al. | 128/334 |

FOREIGN PATENT DOCUMENTS

GB 779291 7/1957

OTHER PUBLICATIONS

D.K. Guilding et al., "Biodegradable Polymers For Use In Surgery Polyglycolic/Polylactic Acid Homo–and Copolymers", Polymer vol. 20 p. 1459–1464 (1979).

D.F. Williams (ed), "Biocompatibility of Clinical Implant Materials", Biodegradable Polymers, vol. 2 Chapter 9, (1981).

Primary Examiner—Samuel A. Acquah

(57) ABSTRACT

High consistency polymers have an inherent viscosity of from about 1.30 to about 1.55, wherein the inherent viscosity is characterized by a standard deviation of about 0.05 or less.

17 Claims, No Drawings

HIGH CONSISTENCY ABSORBABLE POLYMERIC RESIN

This application claims priority from Provisional Application Serial No. 60/225,815 filed on Aug. 16, 2000.

BACKGROUND

1. Technical Field

The present disclosure relates to bioabsorbable polymeric resins especially for use in manufacturing implantable surgical articles. More particularly, this disclosure relates to bioabsorbable polymers having very little variation in inherent viscosity within any given batch of the polymer.

2. Background of Related Art

Bioabsorbable polymers have been prepared from a variety of monomers including glycolide, lactide, p-dioxanone, ε-caprolactone, trimethylene carbonate and others. Absorbable homopolymers and copolymers have been used to fabricate a wide variety of implantable surgical devices such as, for example, clips and staples which are used to seal and/or suture body tissue during a surgical procedure, and to provide hemostasis.

Polymers can be characterized by their molecular weight (M) and degree of polymerization (P). The number average degree of polymerization (P.n.) defines the concentration of separate polymer chains in the polymer. The number average molecular weight $M_n$ is P.n. times the molecular weight of the repeating units in the chain.

The viscosity of a polymer, η, is related to the molecular weight or degree of polymerization. Rather than determine the molecular weight of a polymer, viscosity measurements are commonly used in the absorbable polymer industry as a quick indicator of the polymer's molecular weight. Viscosity measurements are made by dissolving the polymer in a given amount of solvent to form a solution and measuring the solution's resistance to flow at a given temperature.

One type of commonly used viscosity measurement is inherent viscosity $\eta_{inh}$. Inherent viscosity $\eta_{inh}$ is defined by the equation $$\eta_{inh} = \ln \eta_r / c$$

wherein $\eta_r$ is the relative viscosity and c is in units of g/100 cc of solution.

Surgical devices made from bioabsorbable homopolymers or copolymers are often very small. The mechanical properties of the polymer and its dimensional stability can be critical in such applications. The mechanical properties of the polymer depend, at least in part, on its molecular weight. Clearly then, it is important to have consistency in molecular weight (as reflected by viscosity measurements) so that such surgical devices can be made having uniform strength and absorption properties.

However, variations in viscosity are frequently observed not only from one batch of polymer to another using the same process, but even within the same batch of polymer. It would be advantageous to minimize variations in molecular weight, as measured by viscosity, in batches of bioabsorbable polymers.

SUMMARY

Absorbable polymers are provided herein which are highly consistent with respect to inherent viscosity. Specifically, polymers in accordance with this disclosure have an inherent viscosity characterized by a standard deviation of about 0.05 or less. Methods for producing a batch of absorbable polymeric resin having an inherent viscosity characterized by a standard deviation of about 0.05 or less are also described herein.

DETAILED DESCRIPTION OF PREFERRED EMBODIMENTS

While the methods herein are described in terms of the production of an absorbable glycolide-lactide copolymer, for which it is particularly preferred, it should be understood that various alternative monomers may be employed herein for the production of absorbable homopolymers or copolymers. Suitable alternative monomers include, but are not limited to, 1,3-dioxan-2-one, 1,4-dioxan-2-one and ε-caprolactone.

The standard deviation, σ, of a distribution of elements in a population is defined in accordance with the following mathematical formula:

$$\sigma = \left[ (1/N) \sum_{i=1}^{N} (x_i - \mu)^2 \right]^{1/2}$$

wherein N is the number of elements in the population and μ is the mean value, or average:

$$\mu = (1/N) \sum_{i=1}^{N} x_i$$

In a normal, or Gaussian, distribution a graphical representation of a random sampling is depicted by a bell shaped curve in which 68.3% of the population falls within the limits defined by $\mu - \sigma$ and $\mu + \sigma$.

The standard deviation, σ, of the inherent viscosity within a single batch of the polymer as produced according to the method herein, will be no more than about 0.05, preferably no more than about 0.025 and more preferably no more than about 0.01. Thus, if the inherent viscosity is determined by multiple sampling of the batch of polymer, the viscosity readings will exhibit a low variability. That is, the highest and lowest viscosity measurements will be close to the average measurement. Accordingly, the consistency of the polymer produced by the method herein is high.

The term "batch" as used herein refers to the quantity of copolymer retrieved from a polymerization vessel. If polymerization is conducted on a bench scale, a batch may be as little as 0.2 kilograms of copolymer. On a pilot scale, a batch can typically be from about 1 to about 10 kilograms of copolymer. Normally, commercial scale batches contain from about 20 to about 200 kilograms or more of copolymer.

The term "batch viscosity deviation" or "BVD" as used herein refers to the standard deviation of at least ten measurements of inherent viscosity on ten different randomly selected samples from a single batch of copolymer.

Particularly useful absorbable copolymers in accordance with the methods described herein contain from at least about 15% (mole percent) but no more than about 30% glycolide so that fasteners or other implantable surgical devices made from the copolymer is not excessively brittle, exhibits an acceptable absorption profile and is not more than about 20% crystalline. Preferably, the copolymer is substantially amorphous. As used herein, "substantially amorphous" means having 10% or less crystallinity. The copolymer usually should not be more than 20% crystalline so that the fastener will not be more than 10% crystalline. Crystallinity normally decreases with processes that heat the copolymer above melting and then cool rapidly enough to prevent reorientation (e.g., the typical injection molding processes used to fabricate many types of surgical devices). With those processes, the copolymer itself can be of relatively high crystallinity. With processes in which crystallinity is not decreased appreciably, the copolymer must itself be of low crystallinity for the surgical device produced by the process to be substantially amorphous.

The copolymer before being formed into the surgical device should have an inherent viscosity $\eta_{inh}$ of at least 1.3 when measured in chloroform at 30° C. in a concentration of 0.25 g/dl (grams of copolymer per deciliter of solution). A Ubbelohde Viscometer may be used for measuring the viscosity. Where the surgical device being formed is a fastener, the fastener should have an inherent viscosity $\eta_{inh}$ of at least 0.9, which corresponds to an average molecular weight of about 90,000. (The process of forming the fastener from the copolymer tends to reduce the inherent viscosity.)

The glass transition temperature when measured by differential scanning calorimetry at 20° C./min should be at least 56° C. for the copolymer before being formed into a surgical device and at least 54° C. and preferably at least 56° C. after the device is formed. (The fastener forming process tends to reduce the glass transition temperature also.)

A Perkin-Elmer Model DSC-2 Differential Scanning Calorimeter can be used to measure glass transition temperature (Tg). Seven to eight mg of the sample are sealed in a aluminum sample pan, which is then placed in the measuring head of the calorimeter. The sample is heated to relieve all stress and orientation, which may cause spurious thermal effects (e.g., heated at a rate of 20° C./ min. to a temperature of 170°–180° C.) and then cooled at 10° C./min. to a temperature below the expected glass transition temperature (typically to 0° C.) The sample is scanned at a heating rate of 20° C./min. through the glass transition. The glass transition temperature is taken as the mid-point of the transition region. See Collins et al. *Experiments In Polymer Science*, pages 432–433 (1973).

Surgical fasteners fabricated from the polymer made in accordance with the method described herein will retain their in vivo strength for varying amounts of time, depending on the particular fastener construction (e.g., staple or clip) and on the characteristics of the particular copolymer used. Desirably, staples will retain adequate strength in vivo for at least about two to three weeks and clips will retain their in vivo strength for at least about one week. Usually, at least 95% of a surgical fastener will be absorbed into the body within six to eight months of implantation. In certain instances, it may be desirable to use fasteners that are absorbed more slowly.

In particularly useful embodiments, any given batch of the glycolide-lactide copolymer prepared in accordance with the methods described herein has an inherent viscosity of from about 1.30 to about 1.55.

The high consistency achieved by the method herein applies not only to viscosity, but also to composition. A preferred composition for the glycolide-lactide copolymer is 18 mole percent glycolide and 82 mole percent lactide. The standard deviation of glycolide or lactide composition percentages from the desired value is no more than 0.30, preferably no more than about 0.20, more preferably no more than about 0.14.

The copolymers described herein can be made by copolymerizing lactide and glycolide in accordance with the procedure described below. The polymerization typically includes use of a catalyst (e.g., stannous octoate) and an initiator (e.g., glycolic acid).

The method herein is generally preceded by a step in which the polymerization reactor vessel is placed under vacuum of about 1 torr for at least 1 hour while being heated to at least about 190° C. to about 195° C. Drying of the reactor is continued by purging with a dry inert gas (e.g. nitrogen) while maintaining the temperature for at least 1 hour. The vessel is then allowed to cool to below 30° C. prior to loading with the monomers.

The monomers, along with catalyst and initiator, are loaded into a monomer hopper, which is then closed and pressurized with dry nitrogen to 1 psig.

The hopper is then transported to the reactor vessel and the monomers transferred to the reactor under inert gas purge to prevent the entry of outside air or moisture.

The monomers are then dried under an inert gas purge with mild stirring for at least 6 hours at a temperature of less than about 50° C. and atmospheric pressure.

Next, the reactor vessel is pressurized up to about 6 psig. The reactor is gradually heated to a polymerization target temperature of from about 156° C. to about 160° C. under inert gas with stirring at about 3–4 rpm impeller rotation. When the polymerization temperature is reached the stirring is terminated and polymerization is continued for about 8 to about 12 hours, preferably 9½ to 10½ hours, or until a sufficient degree of polymerization has been achieved. Preferably, at about the 6 hour mark the stirring can be restarted for about 2 minutes at 4 rpm impeller rotation.

After the desired reaction time has elapsed the resulting polymeric resin is extruded from the reactor vessel under pressure and quenched, for example, in a water bath and then pelletized, for example by an air knife, to a diameter of preferably about 0.04 to about 0.056 inches.

The pellets are then loaded into a dryer (e.g. an Abbe dryer) and dried in an inert gas purge under a reduced pressure of no more than about 20 torr, preferably no more than about 15 torr and more preferably no more than about 10 torr. The contents of the dryer are preferably agitated by rotation of the dryer to facilitate drying.

The polymer is maintained under vacuum and ambient temperature for at least about 240 minutes (4 hours) and then the temperature of the dryer is ramped up to a drying target temperature of at least about 120° C., preferably from about 125° C. to about 135° C., more preferably from about 128° C. to about 130° C., at the rate of about 1° C. to about 3° C. per hour, preferably about 2° C. per hour. Thereafter, the polymer is maintained at the drying target temperature and reduced pressure until clear of monomer, i.e. at least about 48 hours (2880 min), usually at least about 72 hours (4320 min). The polymer can be periodically sampled and tested by conventional means to determine its composition.

After drying is completed the dryer is allowed to cool down and the dried polymer is retrieved and tested.

The following Example is provided for the purpose of illustrating the invention. A Comparative Example follows, which illustrates a prior known method for making the polymer.

EXAMPLE 1

A hopper was loaded with 43 kg of lactide, 7 kg of glycolide, 50.0 g of glycolic acid (initiator), and 10.0 g stannous octoate (catalyst). The hopper was closed and pressurized to 1 psig with dry nitrogen.

A 10 CV polymerization reactor was evacuated to less than 1 torr and heated to a temperature of 193° C. for two hours, then allowed to cool to ambient temperature.

The monomers catalyst and initiator were then loaded into the reactor under nitrogen purge, and the reactor was sealed.

The monomers in the reactor were then dried at a temperature ranging from about 17.1° C. to about 18.4° C. under 25 L/min. nitrogen flow. An impeller operating at the rate of 3.9 rpm stirred the contents of the reactor. The monomer drying time was 9 hours 45 minutes.

Next the reactor temperature was raised up to about 158° C.±2° C., while the reactor contents were stirred. Stirring was thereafter terminated. The temperature was maintained at about 156° C. to 158° C. for 10 hours of reaction time. The contents of the reactor were stirred again for 2 minutes at 4 rpm impeller rotation rate at the 6 hour mark after commencement of the heating.

After the predetermined reaction time elapsed the resulting polymer was extruded from the reactor into a trough of pyrogen-free water and quenched.

The extruded polymeric resin was cut into pellets by air knives.

Next the pellets were loaded into an Abbe vacuum dryer. The dryer was evacuated to less than 10 torr and a purge flow of 0.5 liters/minute of dry nitrogen was flushed through the dryer. The contents of the dryer were agitated and maintained at ambient temperature for about 4 hours. Thereafter the temperature was ramped up at the rate of 2° C. per hour to 130° C. whereupon the 130° C. temperature was maintained for 76 hrs.

The dryer was then allowed to return to room temperature. The contents of the dryer were sampled and analyzed by conventional methods to determine the inherent viscosity ($\eta_{inh}$) and composition (glycolide mole percentage). Twenty-five samples were selected at random. The results are shown in Table I below.

TABLE 1

| Sample # | $\eta_{inh}$ | % glycolide |
|---|---|---|
| 1 | 1.34 | 17.8 |
| 2 | 1.33 | 17.8 |
| 3 | 1.38 | 18.0 |
| 4 | 1.34 | 17.5 |
| 5 | 1.38 | 17.6 |
| 6 | 1.36 | 17.8 |
| 7 | 1.35 | 17.8 |
| 8 | 1.37 | 18.0 |
| 9 | 1.35 | 17.8 |
| 10 | 1.37 | 17.6 |
| 11 | 1.37 | 17.8 |
| 12 | 1.35 | 18.0 |
| 13 | 1.37 | 17.9 |
| 14 | 1.34 | 17.9 |
| 15 | 1.34 | 18.0 |
| 16 | 1.34 | 18.0 |
| 17 | 1.34 | 17.6 |
| 18 | 1.34 | 18.0 |
| 19 | 1.34 | 17.8 |
| 20 | 1.36 | 17.7 |
| 21 | 1.35 | 17.9 |
| 22 | 1.35 | 17.7 |
| 23 | 1.34 | 17.8 |
| 24 | 1.35 | 17.8 |
| 25 | 1.33 | 17.8 |
| Mean Value | 1.35 | 17.82 |
| Standard Deviation | 0.01 | 0.14 |
| Minimum Value | 1.33 | 17.50 |
| Maximum Value | 1.38 | 18.00 |

Thus, the copolymer produced in accordance with example 1 had a BVD of 0.01, indicating a very high degree of consistency with respect to inherent viscosity.

Comparative Example A

A pre-dried polymerization reactor was loaded with 10.406 kg of lactide, 1.840 kg of glycolide, 2.46 g of stannous octoate, and 90 g of glycolic acid initiator under nitrogen purge, and the reactor sealed. The contents of the reactor were dried for about 6 hours under nitrogen purge.

Next the reactor temperature was raised up to 155° C. The temperature was maintained at approximately 155° C. throughout the reaction time. After 15 hours the polymer was extruded through a two inch screw extruder into pyrogen-free water and quenched.

The extruded polymer was then cut into pellets and dried at elevated temperature under vacuum.

The contents of the dryer were sampled and analyzed by conventional method to determine the inherent viscosity $\eta_{inh}$ and composition (glycolide mole percentage). The results are shown in Table II below.

TABLE II

| Sample # | $\eta_{inh}$ | % glycolide |
|---|---|---|
| 1 | 1.49 | 20.3 |
| 2 | 1.52 | 20.1 |
| 3 | 1.46 | 19.9 |
| 4 | 1.39 | 19.4 |
| 5 | 1.47 | 19.1 |
| 6 | 1.45 | 18.1 |
| 7 | 1.41 | 19.6 |
| 8 | 1.48 | 19.7 |
| 9 | 1.42 | 19.3 |
| 10 | 1.29 | 20 |
| 11 | 1.38 | 20 |
| 12 | 1.33 | 19.7 |
| 13 | 1.29 | 18.7 |
| 14 | 1.25 | 19.1 |
| 15 | 1.29 | 19.3 |
| 16 | 1.31 | 19 |
| 17 | 1.36 | 19.3 |
| 18 | 1.32 | 19 |
| 19 | 1.41 | 19.7 |
| 20 | 1.37 | 20 |
| 21 | 1.41 | 19.7 |
| 22 | 1.4 | 19 |
| 23 | 1.36 | 19.6 |
| 24 | 1.43 | 19.3 |
| 25 | 1.33 | 17.8 |
| 26 | 1.38 | 19.7 |
| 27 | 1.39 | 19.3 |
| 28 | 1.41 | 20.2 |
| 29 | 1.34 | 20.1 |
| 30 | 1.38 | 20.1 |
| 31 | 1.29 | 19.4 |
| 32 | 1.31 | 19.2 |
| 33 | 1.28 | 19.4 |
| 34 | 1.35 | 19.4 |
| 35 | 1.31 | 19.9 |
| 36 | 1.33 | 19.6 |
| Mean Value | 1.37 | 19.53 |
| Standard Deviation | 0.07 | 0.46 |
| Minimum Value | 1.25 | 18.10 |
| Maximum Value | 1.52 | 20.30 |

As can be seen from the above Example 1 and Comparative Example A, the method disclosed herein as exemplified in Example 1 produces a batch of glycolide/lactide copolymer wherein the inherent viscosity of the polymer in the batch is characterized by a Batch Viscosity Deviation (BVD) of only 0.01. The minimum and maximum values of the inherent viscosity are each within 0.03 of the mean (1.35).

By contrast the inherent viscosity of the polymer in the batch produced by the method set forth in Comparative Example A is characterized by a Batch Viscosity Deviation (BVD) of 0.07. The maximum and minimum values of the inherent viscosity vary by as much as 0.15 from the mean value (1.37). With respect to compositional consistency, the standard deviation of the glycolide composition is only 0.14 for the polymer of Example 1 as compared to 0.46 for the polymer of Comparative Example A.

Clearly, the method illustrated in Example 1 produces a batch of polymeric resin having a much higher consistency than that of Comparative Example A.

It will be understood that various modifications may be made to the embodiments described herein. For example, instead of forming fasteners, other surgical devices or implants can be provided from the high consistency polymers described herein. As another example, the high consistency polymers can be employed in forming composites wherein the presently described polymers form the matrix, reinforcing component, or both. Therefore the description should not be construed as limiting, but merely as exemplifications of preferred embodiments. For example, various ratios of monomers may be used. Those skilled in the art will envision other modification within the scope and spirit of the claims appended hereto.

What is claimed is:

1. A composition of matter comprising a batch of copolymer, the copolymer containing repeating units derived from glycolide and repeating units derived from lactide, wherein said batch possesses an inherent viscosity in the range of from about 1.30 to about 1.55, and wherein the standard deviation of inherent viscosity measurements from 10 or more random samples selected from within the batch is about 0.05 or less.

2. The composition of claim 1 wherein the inherent viscosity ranges from about 1.33 to about 1.38.

3. The composition of claim 1 wherein the standard deviation of inherent viscosity measurements is about 0.03 or less.

4. The composition of claim 1 wherein the standard deviation of inherent viscosity measurements is about 0.01 or less.

5. The composition of claim 1 wherein the copolymer contains from about 15 to about 25 mole percent of repeating units derived from glycolide.

6. The composition of claim 1 wherein the copolymer contains from about 75 to about 85 mole percent of repeating units derived from lactide.

7. The of claim 1 wherein the batch contains is at least about 20 kilograms of copolymer.

8. A composition of matter comprising a copolymer containing repeating units derived from glycolide and repeating units derived from lactide, the copolymer having a BVD of about 0.05 or less.

9. A method for making a batch of an absorbable polymeric resin comprising the steps of:
   a) introducing into a reaction vessel at least one monomer;
   b) drying the at least one monomer under an inert gas purge for at least about 6 hours at a temperature of less than about 50° C. and at atmospheric pressure;
   c) polymerizing the at least one monomer at a temperature of from about 156° C. to about 160° C. under an inert gas atmosphere at an elevated pressure of from about 1 psig to about 6 psig for a period of time sufficient to produce a polymeric resin;
   d) drying the polymeric resin in an inert gas atmosphere and under a reduced pressure of no more than about 20 torr psia by maintaining the polymeric resin at ambient temperature for at least about 4 hours, then raising the temperature of the polymeric resin to a drying temperature of at least about 120° C. to about 130° C. at the rate of from about 1° C. to about 3° C. per hour, then maintaining the drying temperature of the polymeric resin for at least about 48 hours to produce a batch of an absorbable polymeric resin having an inherent viscosity characterized by a standard deviation of about 0.05 or less.

10. The method of claim 9 wherein the at least one monomer comprises glycolide and lactide.

11. The method of claim 10 wherein the mole ratio of glycolide to lactide ranges from about 15:85 to 25:75.

12. The method of claim 10 wherein the step of polymerizing the at least one monomer is performed in the presence of a catalyst and an initiator.

13. The method of claim 12 wherein the catalyst is stannous octoate and the initiator is glycolic acid.

14. The method of claim 9 wherein the polymeric resin is extruded, quenched and pelletized prior to the step of drying the polymeric resin.

15. The method of claim 9 further including the steps of heating the reaction vessel at least about 195° C. for at least 1 hour under a reduced pressure of no more than about 1 torr, then purging the reaction vessel with the inert gas and allowing the reaction vessel to cool to below 30° C. prior to the step of introducing the at least one monomer into the reaction vessel.

16. The method of claim 9 wherein the inert gas is nitrogen.

17. A composition of matter comprising batch of copolymer containing repeating units derived from glycolide and repeating units derived from lactide, said batch possessing an inherent viscosity of from about 1.30 to about 1.55, and wherein the standard deviation of inherent viscosity measurements from ten or more random samples selected forms within the batch is about 0.05 or less, the batch being produced by:
   a) introducing glycolide monomer and lactide monomer into a reaction vessel;
   b) drying the glycolide monomer and lactide monomer under an inert gas purge for at least about 6 hours at a temperature of less than about 50° C. and at atmospheric pressure;
   c) polymerizing the glycolide and lactide in the presence of a catalyst and an initiator at a temperature of from about 150° C. to about 165° C. under an inert gas atmosphere at an elevated pressure of from about 1 psig to about 6 psig for a period of time sufficient to produce a glycolide/lactide copolymer;
   d) drying the glycolide/lactide copolymer in an inert gas atmosphere and under a reduced pressure of no more than about 20 torr by maintaining the glycolide/lactide copolymer at ambient temperature for at least about 4 hours, then raising the temperature of the glycolide/lactide copolymer to a maximum drying temperature of from about 125° C. to 130° C. at the rate of from about 1° C. to about 3° C. per hour, then maintaining the temperature of the glycolide/lactide copolymer at the maximum drying temperature for at least about 48 hours.

* * * * *